Sept. 5, 1967 D. RICHMAN 3,340,355

MATRIXING APPARATUS FOR A COLOR-TELEVISION SYSTEM

Filed June 5, 1953

3 Sheets-Sheet 1

Sept. 5, 1967 D. RICHMAN 3,340,355

MATRIXING APPARATUS FOR A COLOR-TELEVISION SYSTEM

Filed June 5, 1953 3 Sheets-Sheet 3

United States Patent Office 3,340,355

Patented Sept. 5, 1967

3,340,355

MATRIXING APPARATUS FOR A COLOR-TELEVISION SYSTEM

Donald Richman, Flushing, N.Y., assignor to Hazeltine Research, Inc., Chicago, Ill., a corporation of Illinois Filed June 5, 1953, Ser. No. 359,734
16 Claims. (Cl. 178—5.4)

*General*

The present invention is directed to matrixing apparatus for a color-television system and, particularly, to such apparatus in color-television receivers for developing from a pair of signals individually representative of different components of the color of a televised image signals representative of other different components of the color of the aforesaid image.

In a form of color-television system more completely described in an article in "Electronics" for February 1952 entitled, "Principles of NTSC Compatible Color Television," at pages 88–95, inclusive, information representative of a scene in color being televised is utilized to develop at the transmitter two substantially simultaneous signals, one of which is primarily representative of the luminance and the other representative of the chromaticity of the image. To develop the latter signals, the scene being televised is viewed by one or more television cameras to develop color signals individually representative of such primary colors as green, red, and blue of the scene and these signals are combined in a manner more fully described in the aforesaid article to develop a signal which primarily represents all of the luminance or brightness information relating to the televised scene. Additionally, these color signals or signals representative thereof are individually applied as modulation signals to a subcarrier wave signal developed at the transmitter, effectively to modulate the latter signal at predetermined phase points thereof to develop the signal representative of the chromaticity of the scene being televised. Conventionally, the modulated subcarrier wave signal or chromaticity signal has a predetermined frequency less than the highest video frequency, for example, a frequency of approximately 3.6 megacycles, and has amplitude and phase characteristics related to the saturation and hue of the color being transmitted. In the specific form of such system, as described in the aforementioned article, the three color signals are initially modified to become three color-difference signals, in other words, to become signals such that when they are individually added in a receiver to the luminance signal, color signals will be developed. Such color-difference signals are usually, but not necessarily, limited in band width to less than 2 megacycles and different ones thereof may have different band widths. The three color-difference signals are combined to form two composite signals which are utilized to modulate the subcarrier wave signal at quadrature-phase points thereof. In one embodiment of such system, which will be considered more fully hereinafter, the phase axes of such quadrature signals do not coincide with any of the three phase axes of the color-difference signals as they inherently occur as modulation components of the subcarrier wave signal. It has become conventional to designate the quadrature signals as I and Q signals and the color-difference signals as $G-Y$, $R-Y$, and $B-Y$ signals, the latter three signals representing respectively the green, red, and blue colors of the image. For reasons which need not be considered more fully herein, the quadrature signal I is usually proportioned to have a band width of approximately 1.3 megacycles, while the signal Q has a band width of approximately 0.4 megacycle. After the modulated subcarrier wave signal including the I and Q signals as modulation components has been developed, the latter wave signal is combined with the luminance signal in an interlaced manner to form in a pass band common to both signals a resultant composite video-frequency signal which is transmitted in a conventional manner.

A receiver in such a television system intercepts the transmitted signal and initially derives therefrom the chromaticity signal and the luminance or brightness signal. The quadrature-modulation components of the chromaticity signal, specifically, the I and Q signals, are derived by a detection means which is designed to operate in synchronism and in proper phase relation with the subcarrier wave-signal modulating means at the transmitter. In view of the lack of coincidence between the quadrature-phase axes of the I and Q signals and the phase axes of the three color-difference signals as modulation signals of the subcarrier wave signal, the detection means further comprises a signal-combining circuit for combining components of the derived I and Q signals to develop the color-difference signals $G-Y$, $R-Y$, and $B-Y$. The color-difference signals, desirably including only chromaticity information, and the derived luminance signal are combined to develop color signals individually representative of the green, red, and blue of the televised image. After being effectively combined, these color signals are utilized in an image-reproducing apparatus to cause this apparatus to develop a color reproduction of the televised scene.

In present detection means in color-television receivers for developing color-difference signals for utilization in such receivers, detection circuits are included for deriving the I and Q signals from the modulated subcarrier wave signal. Since the I and Q signals do not lend themselves directly to utilization by available image-reproducing apparatus, a matrixing apparatus is utilized to combine components of the I and Q signals in different proportions and senses to develop color-difference signals which may be utilized by such image-reproducing apparatus. Such detection means and particularly the matrixing apparatus therein tends to become complex, cumbersome, and expensive because of the multiplicity of circuits included to perform the many varied operations, especially if such operations are performed as at present in a step-by-step manner.

It is, therefore, an object of the present invention to provide a new and improved matrixing apparatus for a color-television system which does not have the disadvantages and limitations of prior such apparatus.

It is also an object of the invention to provide a new and improved matrixing apparatus for a color-television system which includes an exceptionally small number of circuit elements to accomplish its purpose.

It is a further object of the invention to provide a new and improved matrixing apparatus for a color-television system in which the circuit elements thereof perform multiple functions.

In accordance with the present invention, a matrixing apparatus is included in a color-television system for developing from a pair of signals individually representative of different components of the color of a televised image signals representative of other different components of the color of the image. The matrixing apparatus comprises a pair of signal sources for individually supplying different ones of the aforesaid pair of signals, these sources including individual pairs of output terminals having a terminal common to the aforesaid pairs of output terminals. The matrixing apparatus also comprises an impedance network coupled to the aforesaid sources and including three load circuits each having two terminals. One terminal is common to the three load circuits and the other terminal of one of the load circuits is coupled to the common output terminal of the aforesaid sources. The other terminals of the others of the load circuits are individually coupled to different ones of the other output terminals for causing currents representative of both of the supplied signals to flow through each of the load circuits. The impedances of the load circuits are so proportioned relative to each other that the currents flowing through different ones thereof individually represent the aforesaid other different components of the color.

For a better understanding of the present invention, together with other and further objects thereof, reference is had to the following description taken in connection with the accompanying drawings, and its scope will be pointed out in the appended claims.

Referring now to the drawings:

FIG. 1 is a schematic diagram of a color-television receiver including a matrixing apparatus in accordance with the present invention;

FIG. 2*a* is a graph useful in explaining the operation of the matrixing apparatus of FIG. 1;

FIG. 2*b* is a circuit diagram useful in explaining the operation of the matrixing apparatus of FIG. 1;

Figure 1:
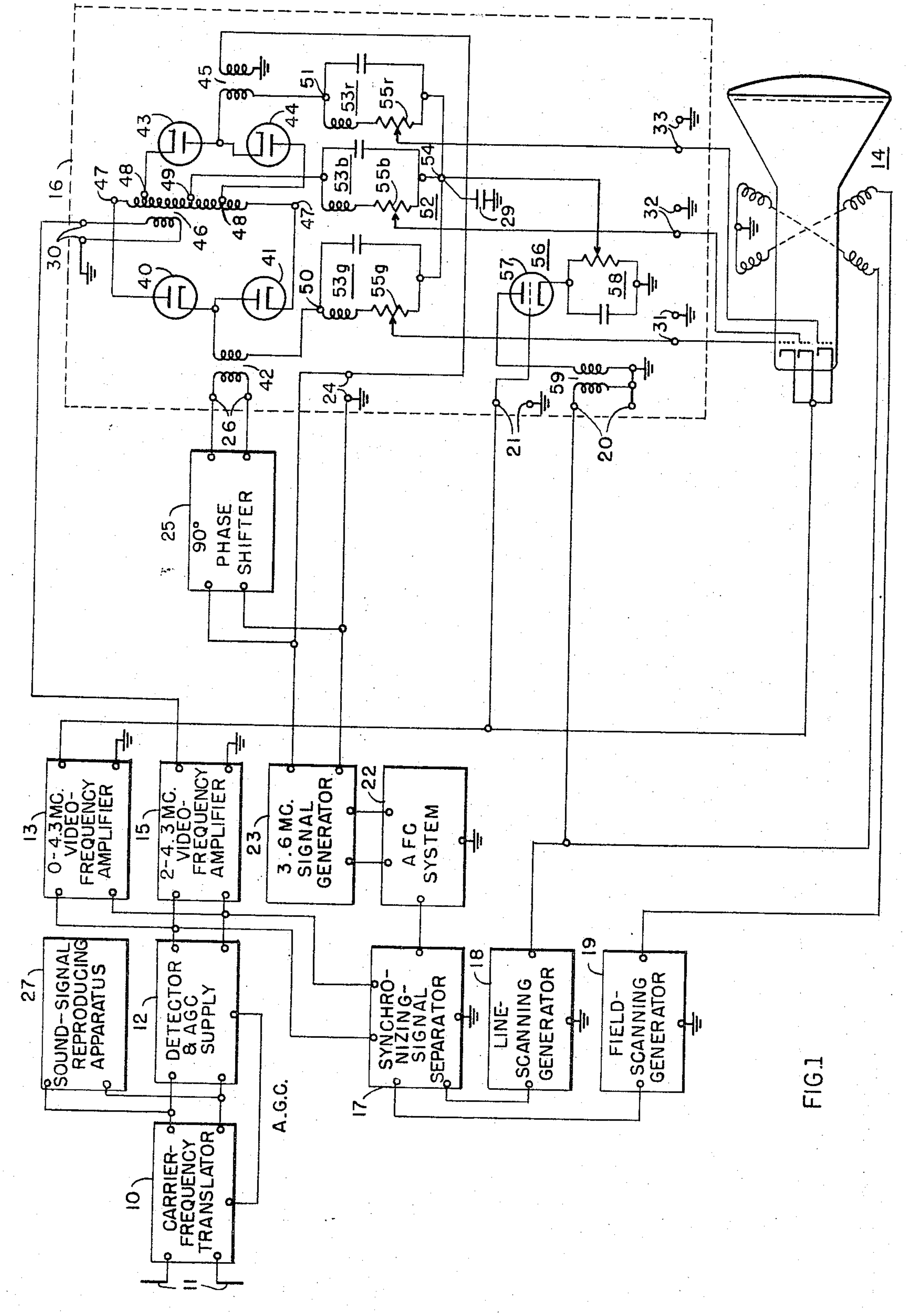

*General description of receiver of FIG. 1*

Referring now to FIG. 1 of the drawings, there is represented a color-television receiver of the superheterodyne type such as may be used in a color-television system of the type previously discussed herein and in the aforesaid "Electronics" article. It is preferable, though not essential, that properly developed luminance and chromaticity signals, which will be considered more fully hereinafter, are utilized in such television system. The receiver includes a carrier-frequency translator 10 having an input circuit coupled to an antenna system 11, 11. It will be understood that the unit 10 may include in a conventional manner one or more stages of wave-signal amplification, an oscillator-modulator, and one or more stages of intermediate-frequency amplification, if such are desired. Coupled in cascade with the output circuit of the unit 10, in the order named, are a detector and automatic-gain-control (AGC) supply 12, a video-frequency amplifier 13 having a pass band preferably of 0–4.3 megacycles, and an image-reproducing device 14 having a cathode input circuit to which the output circuit of the amplifier 13 is connected. The amplifier 13 is an amplifier for the brightness or luminance signal and the output circuit thereof is additionally connected through a pair of terminals 21, 21 to a direct-current restorer circuit in a unit 16 in accordance with the present invention and to be considered more fully hereinafter. The device 14 may, for example, comprise a single cathode-ray tube having a plurality of cathodes and a plurality of control electrodes, different pairs of the cathodes and the control electrodes being individually responsive to different color signals, as will be explained more fully hereinafter, and including an arrangement for directing the beams emitted from the cathodes individually onto different phosphors for developing different primary colors. Such a tube is more fully described in an article entitled "General Description of Receivers for the Dot-Sequential Color Television System Which Employ Direct-View Tri-Color Kinescopes" in the RCA Review for June 1950 at pages 228–232, inclusive. It should be understood that other suitable types of color-television image-reproducing devices may be employed.

An output circuit of the detector 12 is coupled through an amplifier 15, preferably having a pass band of 2–4.3 megacycles, and a matrixing apparatus 16, in accordance with the present invention and to be described more fully hereinafter, to the control electrodes of the image-reproducing device 14. The apparatus 16 has a pair of input terminals 30, 30 connected to the output circuit of the amplifier 15 and has a plurality of pairs of output terminals 31, 31, 32, 32, and 33, 33 individually connected to different ones of the control-electrode circuits in the device 14. The amplifier 15 is an amplifier for the modulated subcarrier wave signal and, thus, the chromaticity signal previously considered herein.

An output circuit of the detector 12 is also coupled through a synchronizing-signal separator 17 to a line-scanning generator 18 and a field-scanning generator 19, output circuits of the latter units being coupled, respectively, to line-deflection and field-deflection windings of the image-reproducing device 14. An output circuit of the generator 18 is also coupled through a pair of terminals 20, 20 to the keyed direct-current restorer circuit in the matrixing apparatus 16.

An output circuit of the synchronizing-signal separator 17 is coupled through an automatic-frequency-control system 22 to a signal generator 23, preferably having a frequency of approximately 3.6 megacycles. The output circuit of the generator 23 is coupled through a 90° phase shifter 25 and a pair of terminals 26, 26 to an input circuit of the matrixing apparatus 16, and the output circuit of the generator 23 is also coupled through a pair of terminals 24, 24 to another input circuit of the apparatus 16.

The AGC supply of the unit 12 is connected through the conductor identified as AGC to input terminals of one or more of the stages in the unit 10 to control the gains of such stages to maintain the signal input to the detector 12 within a relatively narrow range for a wide range of received signal intensities. A sound-signal reproducing unit 27 is also connected to an output circuit of the unit 10 and it may include stages of intermediate-frequency amplification, a sound-signal detector, stages of audio-frequency amplification, and a sound-reproducing device.

It will be understood that the various units thus far described, with the exception of the matrixing apparatus 16, may be of any conventional construction and design, the details of such units being well known in the art and requiring no further description.

*General operation of receiver of FIG. 1*

Considering briefly now the operation of the receiver of FIG. 1 as a whole, a desired composite television signal preferably of the constant luminance type is intercepted by the antenna system 11, 11, is selected, amplified, converted to an intermediate frequency, and further amplified in the unit 10, and the video-frequency modulation components thereof are derived in the detector 12. These video-frequency modulation components comprise synchronizing components, the aforementioned modulated wave signal or chromaticity signal, and a luminance or brightness signal. The luminance or brightness signal is further amplified in the amplifier 13 applied to the cathodes of the image-reproducing device 14 and through the terminals 21, 21 to the direct-current restorer circuit in the unit 16. The synchronizing components including line-frequency and field-frequency synchronizing signals as well as a color burst signal for synchronizing the operation of the color-signal deriving apparatus in the unit 16 are separated from the video-frequency components and from each other in the synchronizing signal separator 17. The line-frequency and field-frequency synchronizing components are applied, respectively, to the units 18 and 19 to synchronize the operation of these generators with the operation of related units at the transmitter. These generators supply signals of saw-tooth wave form which are properly synchronized with respect to the transmitted signal and are applied to the line-deflection and field-deflection windings in the device 14 to effect a rectilinear scanning of the image screen in the device 14. The color burst signal which is substantially a few cycles of an unmodulated portion of the subcarrier wave signal having a desired reference phase is applied to the automatic-frequency-control system 22 to control the frequency and phase of the signal developed in the signal generator 23. The unmodulated signal developed in the generator 23 is applied substantially without phase delay through terminals 24, 24 and with substantially 90° phase delay through the unit 25 and the terminals 26, 26 to the color signal deriving apparatus in the unit 16.

The modulated subcarrier wave signal is amplified in the unit 15 and applied through the terminals 30, 30 to the matrixing apparatus 16. The unit 16, in a manner to be explained more fully hereinafter, initially effects the derivation of the quadrature components of the subcarrier wave signal, specifically, the I and Q signals, and from these develops $G-Y$, $R-Y$, and $B-Y$ color-difference signals. The latter color-difference signals are individually applied through different pairs of the terminals 31, 31, 32, 32, and 33, 33 to different ones of the control electrodes of the image-reproducing device 14. The luminance signal applied to the cathodes of this device and each of the color-difference signals effectively combine in the device 14 to develop color signals G, R, and B and individually control the intensities of different beams in the device 14. This intensity modulation of the cathode beams together with their alignment and the resultant excitation of different color phosphors on the image screen of the device 14 is effective to cause a color image to be reproduced on such screen.

The automatic-gain-control (AGC) signal developed in the unit 12 is effective to control the amplification of one or more of the stages in the unit 10, thereby to maintain the signal input to the detector 12 and to the sound-reproducing apparatus 27 within a relatively narrow range for a wide range of received signal intensities. The sound-signal modulated wave signal having been selected and amplified in the unit 10 is applied to the sound-reproducing apparatus 27. Therein it is amplified and detected to derive the sound-signal modulation components which may be further amplified and then reproduced in the reproducing device of the unit 27.

*Description of matrixing apparatus of FIG. 1*

Referring now to the matrixing apparatus 16 of FIG. 1, as will be made clear hereinafter, the purpose of the apparatus 16 in a color-television system is to develop from a pair of signals, specifically, from modulation signals I and Q which are composite signals individually comprising in predetermined proportions a plurality of signals individually representative of different primary colors of a televised image, signals representative of other different components of the color of the image, specifically, color-difference signals such as $G-Y$, $R-Y$, and $B-Y$. The apparatus 16 comprises a pair of signal sources for individually supplying different ones of the I and Q signals, these sources including individual pairs of output terminals having a terminal common to the pairs. More specifically, these sources of the I and Q signals comprise means for supplying a modulated wave signal, having the I and Q signals as modulation components thereof, and a pair of balanced detector circuits for deriving from the subcarrier wave signal the I and Q modulation components thereof so that the derived components have different magnitudes and polarities. The means for supplying the modulated wave signal comprises a supply circuit, specifically, a transformer 46 and the pair of terminals 30, 30, the primary of the transformer being coupled through the terminals 30, 30 to the output circuit of the amplifier 15. The supply means also includes the secondary winding of the transformer 46 which has two pairs of terminals, specifically, pairs 47, 47 and 48, 48 and a terminal 49 intermediate both of these pairs for supplying the modulated wave signal at different magnitudes. For the purpose of obtaining such magnitudes, for reasons which will be explained more fully hereinafter, the turns of the secondary winding between the terminals 47, 47 and between the terminals 48, 48 are in the ratio of 4.34:3.73 when the gains for the I and Q signals are substantially equal in the channels prior to the pair of terminals 48, 48.

One of the balanced detectors of the aforementioned signal sources comprises a pair of electron-discharge devices, specifically, diodes 40 and 41 connected in series through the terminals 47, 47 with the secondary winding of the transformer 46, the anode of the diode 41 being connected to the cathode of the diode 40 and also coupled through a transformer 42 and the pair of terminals 26, 26 to the output circuit of the phase shifter 25. The diodes 40 and 41 are so poled as to conduct current in one sense, specifically, from the upper terminal 47 to the lower terminal 47 for deriving the modulation component Q with a negative polarity. It will be understood that when the term "polarity" is used herein with respect to signals such as I and Q which may be other than unidirectional in potential, it is meant that the instantaneous relative polarities of such signals are either in the same sense and, thus, both positive or both negative or are in opposite senses and, thus, one negative and the other positive.

The other balanced detector comprises a similar pair of diodes 43 and 44 connected in series with a portion of the secondary winding of the transformer 46 through the terminals 48, 48 and coupled through a transformer 45 and the pair of terminals 24, 24 to the output circuit of the generator 23. The diodes 43 and 44 are effectively in parallel with the diodes 40 and 41 and are so poled as to conduct in a sense opposite the sense of conduction of the diodes 40 and 41, specifically, from the lower terminal 48 to the upper terminal 48 for deriving the modulation component I with a positive polarity. The detector including the diodes 40, 41 includes a pair of output terminals 49, 50, the terminal 50 being at the end of the secondary winding of the transformer 42 remote from the connection of such winding to the diodes 40 and 41. The detector including the diodes 43 and 44 also includes a pair of output terminals one of which is the terminal 49 and the other of which is a terminal 51 at the end of the secondary winding of the transformer 45 remote from the coupling of such winding to the diodes 43 and 44.

The matrixing apparatus also comprises an impedance network, specifically, a network 52 coupled to the aforesaid sources and including three load circuits each having two terminals, one of which is a common terminal 54 with the other terminal of one of the load circuits coupled to the common output terminal 49 and with the other terminals of the others of the load circuits individually coupled to the different ones of the other output terminals. More specifically, the impedance network 52 comprises three load circuits 53*g*, 53*b*, and 53*r* having pairs of terminals 50, 54, 49, 54, and 51, 54, respectively. Each of the load circuits comprises a series circuit of an inductor and a resistor in parallel with a condenser, the inductor and condenser comprising a filter circuit, preferably, a low-impedance shunt circuit through the condenser thereof for signals having frequencies higher than the highest frequency of the derived modulation signal, for example, higher than 1.5 megacycles and, specifically, for the subcarrier wave signal. The resistor in each of the load circuits comprises a substantial portion of a high-impedance circuit, more specifically, being the load resistor for the derived modulation components and has a terminal intermediate the end terminals thereof. The other parameters of such high-impedance circuits are impedances due to stray capacitance and inductance and to the inherent impedances of the physical inductors and capacitors in each load circuit. The resistors for the circuits 53*g*, 53*b*, and 53*r* are 55*g*, 55*b*, and 55*r*, respectively. As will be explained more fully hereinafter, the total impedances of the load circuits and the impedances of the fractional portions of the resistors 55*g*, 55*b*, and 55*r* at the intermediate terminals as well as the magnitudes and senses or polarities of the signals supplied by the balanced detectors are so proportioned relative to each other that the currents flowing through different ones of the load circuits individually represent different desired color-difference signals. Voltages representative of different ones of the color-difference signals are individually developed at different ones of the intermediate terminals. The intermediate terminals of the resistors 55*g*, 55*b*, and 55*r* are individually connected through different pairs of the terminals 31, 31, 32, 32, and 33, 33, respectively to different control electrodes in the image-reproducing device 14. The common terminal 54 is connected through a condenser 29 to chassis-ground for signals having frequencies higher than the highest frequency of the derived modulation signal, for example, for signals having frequencies higher than 1.5 megacycles.

The impedance network may also include, if direct-current restoration is desired, a direct-current restorer circuit 56 having a portion thereof coupled between the terminal 54 and chassis-ground. Otherwise, the terminal 54 may be connected to chassis-ground or to a source of other desired potential level. If a direct-current restorer such as the unit 56 is utilized, it comprises a triode 57, the cathode circuit of which includes a time-constant circuit 58 having a time constant substantially longer than the period of a line of scan. The control-electrode circuit of the tube 57 is coupled through the pair of terminals 21, 21 to the output circuit of the amplifier 13 while the anode circuit of the tube 57 is coupled through the transformer 59 and a pair of terminals 20, 20 to an output circuit of the line-scanning generator 18. A fractional portion of the resistor in the time-constant circuit 58 is connected through an intermediate terminal on the resistor to the terminal 54.

*Operation of matrixing apparatus of FIG. 1*

Prior to considering the details of operation of the matrixing apparatus 16 of FIG. 1, it will be helpful to consider generally the manner of operation of such apparatus to develop the desired *G-Y, B-Y,* and *R-Y* color-difference signals individually for application to different ones of the control electrodes in the device 14. In considering such general explanation, it will be helpful to refer to the vector diagram of FIG. 2*a*, this diagram representing the relative relations in phase and magnitude of the modulation components I and Q with respect to each other and with respect to the desired color-difference signals $G-Y$, $B-Y$, and $R-Y$ as these signals appear as modulation components on the modulated subcarrier wave signal applied through the transformer 46 to both of the balanced detector circuits. The signal derived from the subcarrier wave signal by the balanced detector including the diodes 40 and 41 is the signal represented by the vector −Q. This derivation is effected in such balanced detector by heterodyning the signal developed in the generator 23 and which is phase shifted 90° by the unit 25 with the modulated subcarrier wave signal applied through the transformer 46 and the terminals 47, 47 to the diodes 40 and 41. The heterodyning of the locally generated signal and the modulated subcarrier wave signal when these signals are in proper phase relation as explained in the previously mentioned "Electronics" article is effective to derive the modulation component at a desired phase angle of the modulated subcarrier wave signal, specifically, that component represented by the vector −Q. Similarly, at another phase angle the modulation component represented by the vector I is derived by the balanced detector including the diodes 43 and 44. By utilization of the proper turns ratios in the transformer 46, the derived signals I and −Q are proportioned to have the relative magnitudes 3.73 and 4.34, respectively, as represented by the lengths of the vectors I and −Q. The reason for such relation in magnitude will be explained more fully hereinafter. The signal I is positive while the signal Q just mentioned is negative due to the different sensings of the pairs of diodes in the different balanced detector circuits. The signal I is effectively developed between the output terminals 49, 51 while the signal −Q is effectively developed between the output terminals 49, 50. This development is only an effective development since actually, in view of the many purposes of the circuit components in the apparatus 16, complex signals are developed at these points and an artificial circuit would be needed to measure the magnitudes of the signals I and Q at these points.

Figure 2A:
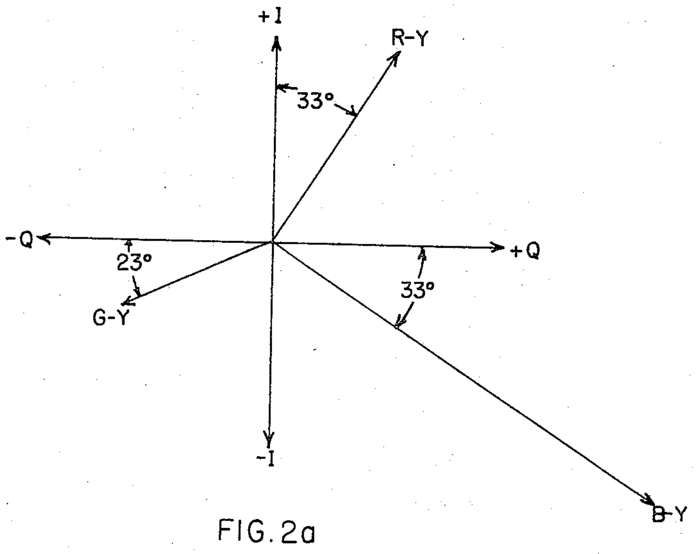

Further examination of the vector diagram of FIG. 2*a* indicates that the desired color-difference signals $R-Y$, $B-Y$, and $G-Y$ can be developed from the derived signals +I and −Q by combining proper proportions and polarities of the latter signals. Thus, the signal $R-Y$ can be developed by combining proper proportions of positive I and positive Q signals, the signal $B-Y$ can be developed by combining proper proportions of a positive Q and a negative I signal, while the signal $G-Y$ can be developed by combining proper proportions of negative I and negative Q signals. In one type of television system these proportions are defined as follows:

$$R-Y=.96I+.62Q \quad (1)$$

$$B-Y=-1.11I+1.70Q \quad (2)$$

$$G-Y=.27I-.65Q \quad (3)$$

Such proportions are determined by the primary colors employed in the television system and by other factors relating to color fidelity in image reproduction. It should be understood that the relations defined by Equations 1–3, inclusive, are exemplary only and other relations may be employed equally well without departing from the invention. The impedance network 52 and, specifically, the load circuits 53*g*, 53*b*, and 53*r* comprise, by means of the proportioning of the magnitudes and senses of the signals +I and −Q and of the impedances of the load circuits and of the tapped portions thereof and by means of the current paths provided by the connections of such circuits to one another and to the balanced detector circuits, a matrixing circuit for developing the $R-Y$, $B-Y$, and $G-Y$ signals from the +I and −Q signals. The manner in which the load circuits 53*g*, 53*b*, and 53*r* are proportioned will now be explained in more detail.

Figure 2B:
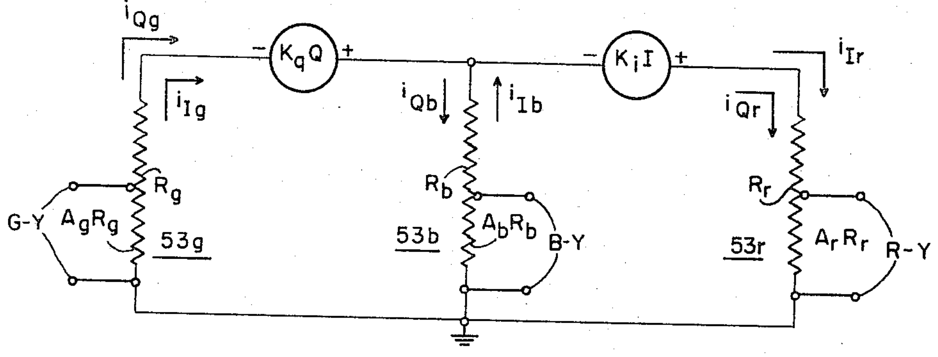

In order to understand the proportioning of the constants of the load circuits 53*g*, 53*b*, and 53*r*, it is helpful diagrammatically to represent the essential portions of these load circuits and of the sources for the +I and −Q signals in the manner of FIG. 2*b* of the drawings. In FIG. 2*b*, the generator for developing the −Q signal is represented as $K_qQ$ where $K_q$ represents the magnitude of the signal −Q. Similarly, the source of the signal I is represented as $K_iI$. The polarities of +I and −Q are arbitrary and are employed herein because the matrixing apparatus is simpler in design when signals of such polarities are applied to the input circuits thereof. The load resistors 55*g*, 55*b*, and 55*r* of FIG. 1 are represented by the resistors $R_g$, $R_b$, and $R_r$, respectively, the fractional portions of these resistors being represented as $A_gR_g$, $A_bR_b$, and $A_rR_r$, respectively. The currents flowing from the generators $K_qQ$ and $K_iI$ are represented by the letter *i* with an initial subscript identifying the generator from which the current flows and a second subscript identifying the load resistor through which the current is flowing. The arrows associated with the different current representations indicate the direction of flow of such currents. For example, the current flowing from the generator $K_qQ$ and through the load resistor $R_b$ from the high potential to the ground terminal of such resistor is represented as $i_{Qb}$. In terms of the polarities of the signals I and Q previously mentioned herein to develop the color-difference signals $G-Y$, $R-Y$, and $B-Y$ and as defined by Equations 1–3, inclusive, it should be noted that the directions of flow of the currents $i_Q$ and $i_I$ through the resistors $R_g$, $R_b$, and $R_r$ correspond to the required polarities of I and Q to develop the different color-difference signals. Thus, as defined by Equation 1, predetermined amounts of +I and +Q are required. It should be noted that the currents $i_{Qr}$ and $i_{Ir}$ flowing through the load resistor $R_r$ are in the same sense and may be considered to develop positive components of the signals I and Q across the resistor $R_r$. On the other hand, the currents flowing through the resistor $R_g$ are also in the same sense but opposite to the sense of the currents flowing through the resistor $R_r$. Therefore, these may be considered to develop negative components of I and Q as required to develop the signal $G-Y$ defined by Equation 3. In a similar manner, the currents flowing through the resistor $R_b$ are in opposing senses as required to develop the signal $B-Y$ defined by Equation 2. The desired magnitudes for the potentials of the signals $G-Y$, $B-Y$, and $R-Y$, in accordance with the established relationships of such potentials in the color-television system being utilized, may be developed by proper proportioning of the magnitudes of the load resistors $R_g$, $R_b$, and $R_r$ and of the fractional portions of these resistors in addition to proportioning the magnitudes and controlling the senses of the signals I and Q. Thus, in a television system wherein the relationships defined by Equations 1–3, inclusive, hold, the proper magnitudes of the signals I and Q for developing the different ones of the color-difference signals can be determined in terms of equations defining the flow of current through and the potentials developed across the resistors $R_g$, $R_b$, and $R_r$. Thus, the color difference signals defined by Equations 1–3, inclusive, may be further defined in terms of current and resistor parameters of the circuit of FIG. 2*b* as follows:

$$R-Y=A_rR_r(i_{Ir}+i_{Qr}) \quad (4)$$
$$B-Y=A_bR_b(-i_{Ib}+i_{Qb}) \quad (5)$$
$$G-Y=A_gR_g(-i_{Ig}-_{Qg}) \quad (6)$$

The current terms in Equations 4-6, inclusive, by conventional circuit analysis can be defined in terms of the magnitudes of the signals $K_qQ$ and $K_iI$ and in terms of the total loads for these signals as defined by combinations of the load resistors $R_g$, $R_b$, and $R_r$. Using such relationships and selecting a predetermined parameter for one of the load resistors, for example, the resistor $R_b$ and assuming that the total resistance $R_b$ is employed to develop the signal $B-Y$ instead of a fractional portion thereof, in other words, assuming $A_b$ is equal to 1, the following values may be derived for the circuit parameters of a circuit such as represented by FIG. 2*b*:

$A_b=1$
$A_g=.24$
$A_r=.37$
$K_i=3.73$
$K_q=4.34$
$R_b$=a selected magnitude in ohms
$R_g=.79R_b$
$R_r=1.04R_b$ Referring again to FIG. 1 and using the relationships just described, the transformer 46, as has been mentioned previously, has such turns ratios in the secondary thereof that the signal −Q developed across the secondary of the transformer 42 and the signal +I developed across the secondary of the transformer 45 have magnitudes which correspond to the relationships of the factors $K_q$ and $K_i$, respectively. The total load resistance for each of the derived modulation signals in each of the load circuits 53*g*, 53*b*, and 53*r* is defined by the magnitude of the corresponding one of the resistances $R_g$, $R_b$, and $R_r$ and the magnitude of the fractional portions of the resistors 55*g*, 55*b*, and 55*r*, is as defined by the terms $A_g$, $A_b$, and $A_r$, respectively. With such proportioning, the signals developed across the pairs of output terminals 31, 31, 32, 32, and 33, 33 are $G-Y$, $B-Y$, and $R-Y$, respectively, as defined by Equations 1–3, inclusive, above.

The direct-current restorer 56 serves solely to provide direct-current restoration for the color-difference signals developed in the load circuits 53*g*, 53*b*, and 53*r*. During the blanking period when no video content is present in the signal derived in the output circuit of the detector 12 and translated through the amplifier 13, the tube 57 is gated into conduction by a pulse signal applied from an output circuit of the generator 18 and through the pair of terminals 20, 20 to the anode of the tube 57. Conduction of the tube 57 at this time develops a potential representative of the level of the synchronizing-signal peaks across the time-constant circuit 58. This potential, due to the relatively long time constant of the circuit 58, remains substantially undiminished for at least the period of a line. An appropriate portion of such potential to set black level is tapped from the resistor of the circuit 58 and utilized to establish black level for the load circuits 53*g*, 53*b*, and 53*r*.

Figure 3:
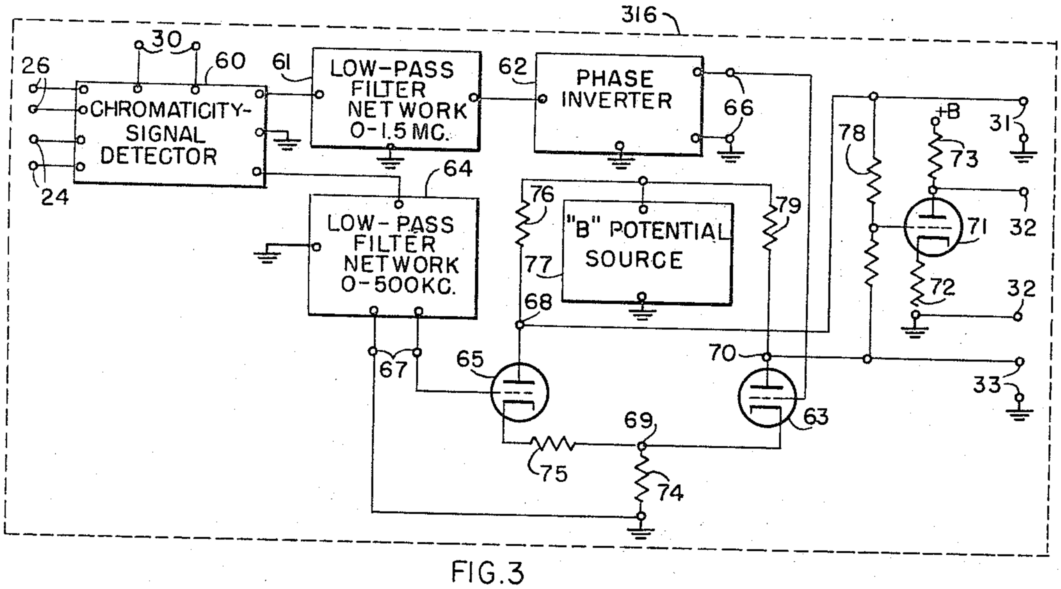
FIG. 3 is a schematic diagram of a modified form of the matrixing apparatus of FIG. 1.

*Description of matrixing apparatus of FIG. 3*

Though the matrixing apparatus described with reference to FIG. 1 is simple and is capable of effecting the complex demodulation and matrixing needed to develop the color-difference signals and utilizes a small number of circuit components to effect such result, such apparatus may not provide sufficient gain for all purposes for the I and Q signals derived from the subcarrier wave signal, for example, if subcarrier wave signals of low peak-to-peak amplitude are employed or increased noise immunity is desired. It may be desirable to effect greater gain of the latter signals without unduly increasing the complexity of the matrixing apparatus. The apparatus of FIG. 3 effects such result. In describing the apparatus of FIG. 3 and of other figures hereinafter, terminals corresponding to the terminals in the apparatus 16 of FIG. 1 are identified by the same reference numerals to indicate that they would be connected to the other portions of the television receiver as the corresponding terminals in apparatus 16 are connected thereto.

The matrixing apparatus 316 of FIG. 3 comprises a pair of signal sources for individually supplying different ones of the aforementioned I and Q signals, these sources including individual pairs of output terminals having a common terminal. More specifically, one of such sources comprises a chromaticity-signal detector having a pair of output circuits and a low-pass filter network 61 preferably having a pass band of 0–1.5 megacycles, a phase inverter 62, and a triode 63 coupled in cascade, in the order named, to one of the output circuits of the unit 60. The triode 63 includes a pair of output terminals 70, 69 coupled, respectively, in the anode and cathode circuits thereof. The other of such sources includes the unit 60 and a low-pass filter network 64 preferably having a pass band of 0–500 kilocycles and a triode 65 coupled in cascade, in the order named, to the other output circuit of the unit 60. The triode 65 includes a pair of output terminals 68, 69 coupled, respectively, in the anode and cathode circuits thereof. A plurality of input circuits of the detector 60 individually include different ones of the pair of terminals 30, 30, 26, 26, and 24 24. The unit 60 may be of conventional type for deriving positive I and Q signals from an applied modulated subcarrier wave signal. For example, it may comprise the balanced detector circuit of FIG. 1 including the diodes 40, 41 and 43, 44 with the polarity of the diodes 40, 41 the same as that of the diodes 43, 44 and without the impedance network 52. In such detector the positive I and Q signals are developed across the secondary windings of the transformers 45 and 42, respectively, and such windings would be coupled to the input circuits of the units 61 and 64, respectively, in FIG. 3.

The apparatus 316 of FIG. 3 also includes an impedance network, specifically, the anode and cathode load circuits of the tubes 65 and 63 coupled, respectively, to the pair of output terminals 68, 69 and 70, 69. Such network includes three load circuits each having two terminals, one of which is common to the three load circuits with the other terminal of one thereof coupled to the common output terminal 69 and with the other terminals of the others of the load circuits individually coupled to different ones of the other output terminals 68 and 70 for causing currents representative of both of the supplied signals to flow through each of these load circuits. More specifically, these three load circuits comprise a cathode resistor 74 coupled in a common cathode circuit for the tubes 63 and 65, one terminal of the resistor 74 being connected to the common output terminal 69 and the other thereof connected to chassis-ground. Chassis-ground is the common terminal for the three load circuits of the impedance network being described. A second of these load circuits comprises a cathode resistor 75 coupled between the aforementioned output terminal 69 and the cathode of the tube 65 and further comprises an anode load impedance. This anode impedance comprises in series a resistor 76 having one terminal thereof coupled to the anode of the tube 65 and to the aforementioned output terminal 68, and a source of B potential 77 having the negative terminal thereof connected to the common terminal for the three load circuits, that is, to chassis-ground. The third load circuit comprises an anode load impedance including a load resistor 79 connected to the anode of the tube 63 and the aforementioned output terminal 70 connected in series with the source 77. The second and third load circuits may be considered to include a tapped resistor 78 connected between the anodes of the tubes 63 and 65 and a phase-inverter amplifier including a triode 71 having the control electrode thereof connected to the tap of the resistor 78. The triode 71 includes an anode load resistor 73 and a cathode resistor 72. It is apparent that currents representative of both of the applied signals +Q and —I flow through each of the above-described load circuits. As will be explained more fully hereinafter, the impedances of these three load circuits are so proportioned relative to each other that the currents flowing through different ones thereof individually represent the other different components of the color, specifically, the color-difference components $G-Y$, $R-Y$, and $B-Y$.

*Operation of matrixing apparatus of* FIG. 3

Briefly considering now the operation of the matrixing apparatus 316, the modulated subcarrier wave signal is applied through the terminals 30, 30 to an input circuit of the chromaticity-signal detector 60 while properly phased signals developed in a generator, such as the unit 23 of FIG. 1, are applied through the pairs of terminals 26, 26 and 24, 24 to the detector 60 so as individually to heterodyne with the modulated subcarrier wave signal in a manner previously explained more fully herein and also in the aforementioned "Electronics" article to develop I and Q outputs signals. Those components of the I signal developed in the unit 60 and having frequencies below 1.5 megacycles are translated through the filter network 61, inverted in phase by the inverter 62, and applied to the control electrode of the tube 63 to develop a +I signal in the anode circuit and a —I signal in the cathode circuit of the tube 63. Those components of the Q signal developed in the output circuit of the detector 60 having frequencies below 500 kilocycles are translated through the network 64 and applied to the control-electrode circuit of the tube 65 to develop —Q signals in the anode and +Q signals in the cathode circuits of the tube 65. Considered broadly, the tubes 65 and 63 are generators such as the units $K_qQ$ and $K_iI$ of FIG. 2*b*. The cathode load resistor 74 corresponds to the resistor $R_b$ of FIG. 2*b* and the resistors 76 and 79 correspond, respectively, to the resistors $R_g$ and $R_r$ of FIG. 2*b*. The bridging resistor 78 is solely a means for deriving with desired phase and magnitude the color-difference signal $-(B-Y)$ effectively developed substantially as a positive $B-Y$ signal across the cathode resistor 74. The currents flowing through the resistors 76, 79, and 74 represent, respectively, the color-difference signals $G-Y$, $R-Y$, and $B-Y$. Though the current flowing through the resistor 74 represents the positive signal $B-Y$, it is preferred in the embodiment of FIG. 3 to derive the negative signal $-(B-Y)$ from the bridging resistor 78 through which portions of the currents developed by the I and Q signals applied to the tubes 63 and 65 flow in opposing directions as they also flow in the resistor 74.

Referring again to FIG. 2*a*, it should be noted, as previously mentioned herein, that negative portions of —Q and —I are required to develop the color-difference signal $G-Y$, positive portions of the Q and I signals are required to develop the signal $R-Y$, and a positive portion of Q signal and a negative portion of the I signal are required to develop the signal $B-Y$. The resistors 74–76, inclusive, 78, and 79 are proportioned to effect such results while the amplifier stage including the tube 71 is proportioned to increase the magnitude of the $-(B-Y)$ signal developed at the tap on the resistor 78 and to invert such signal so that the positive $B-Y$ signal developed across the terminals 32, 32 is properly related in magnitude and sense to the positive $G-Y$ and $R-Y$ signals developed across the terminals 31, 31 and 33, 33, respectively. In view of the consideration given with respect to the mathematical analysis of such a circuit to determine such proportioning in FIG. 1, it is not believed necessary to include a detailed mathematical analysis for the circuit of FIG. 3. However, a general explanation of the manner of proportioning will now be presented.

Referring to the vector diagram of FIG. 2*a*, it is noted that, in order to develop the signal $G-Y$ in terms of Equation 3 above, a fraction .65 of a negative Q signal is required and a fraction .27 of a negative I signal is required. Referring to the tube 65 in FIG. 3, it is noted that a negative Q signal is developed in the anode circuit thereof while a positive Q signal is developed in the cathode circuit thereof. In the anode and cathode circuits of the tube 63, positive and negative I signals, respectively, are developed. The signal —I in the cathode circuit of the tube 63 causes a —I signal to be developed in the anode circuit of the tube 65 in a conventional manner and the load resistors 76 and 75 together with the common resistor 74 together with any other parameters of the circuits which affect the signals developed in the anode circuits of the tubes 63 and 65 are proportioned so that the quantities of —I and —Q signals at the terminal 68 are in the ratio of .65Q and .27I. In such proportioning the effects of currents flowing through the resistor 78 should also be considered as such effects may require compensation by a change in the proportioning of the magnitudes of other circuit parameters. In order to develop the $R-Y$ signal in accordance with Equation 1 above, the portions +.96I and +.62Q are required. The positive I signal developed at the terminal 70 combines with a positive Q signal developed at the terminal 70 by application of a +Q signal from the cathode of the tube 65 to the cathode of the tube 63. The signals combine in the proper proportions due to the proportioning of the resistors 74, 79, and 78 as well as the resistor 75 in the cathode circuit of the tube 65. Again, as previously mentioned, the effect of the current flowing in the resistor 78 should be considered in determining the proportioning of these resistors to develop the proper proportions of I and Q signals at the terminal 70, and other parameters of the tube may also require consideration of the type normally made when designing tube circuits. In order to develop the positive $B-Y$ signal in accordance with Equation 2 above, the portions −1.11I and +1.70Q of the I and Q signals are required. +Q and −I signals are developed across the cathode load resistor 74 and such may be used to provide the $B-Y$ signal as will become more understandable by considering FIG. 4 hereinafter. However, pure −Q and +I signals may also be considered to be present across the resistor 78, if the contamination of the −Q signal by a fraction of the I signal at the upper terminal of the resistor 78 is compensated for by an excess of the I signal applied to the lower terminal and similarly if the contaminated I signal at the lower terminal is corrected by an excess of Q signal at the upper terminal. In other words, though pure −Q and +I signals may not be present at the end terminals of the resistor 78, effectively such signals are present when considering the current flowing through the resistor 78. Such current is substantially that which pure −Q and +I signals would develop. The negative Q signal at the terminal 68 combines in the resistor 78 with the positive I signal at the terminal 70 to develop at a properly selected tap point of the resistor 78 a negative $B-Y$ signal having the Q and I signals in the proportions just mentioned. The triode 71 acts as a phase inverter to develop the positive $B-Y$ signal from the negative $B-Y$ signal and as an amplifier to provide an adequate magnitude for the positive $B-Y$ signal.

The mathematical analysis required to develop the proper proportions of the I and Q signals in the proper senses at the different points mentioned above may be developed by a straightforward technique of circuit analysis. Some indication of the degree and manner of such proportioning may be obtained by considering the vector diagram of FIG. 2*a*. In considering such vector diagram, it is noted that if the I and −Q vectors are spread apart in angular relation so as individually to coincide with the $R-Y$ and $G-Y$ vectors, the color-difference signals represented by the latter vectors will thereby be obtained. The cathode resistor 74 is effective to cause such spreading of the vectors. However, since the vector $R-Y$ is displaced by approximately 33° with respect to the vector I while the vector $G-Y$ is only displaced by approximately 23° with respect to the vector −Q, the spreading of the Q vector should not be as great as the spreading of the I vector and, therefore, the additional cathode resistor 75 is connected in the cathode circuit of the tube 65 to minimize the effect on the I signal. The resistors 76 and 79 then may be considered to be proportioned to develop proper magnitudes of the $R-Y$ and $G-Y$ signals. Considering the vector diagram of FIG. 2*a* with reference to obtaining the $B-Y$ signal from the I and −Q signals, it should be noted that if a line is placed between the ends of the vectors $R-Y$ and $-(G-Y)$ obtained from the signals +I and −Q, a negative $B-Y$ vector will intersect such line at some intermediate point thereof. The tapped position on the resistor 78 represents such intersection point, and the tube 71 with the circuit parameters thereof inverts the negative $B-Y$ signal to a positive $B-Y$ signal and provides adequate gain so that the signals $G-Y$, $B-Y$, and $R-Y$ developed across the pairs of terminals 31, 31, 32, 32, and 33, 33, respectively, are in the proper relative magnitudes.

While applicant does not intend to be limited to any particular circuit design, design information has been developed which has been found useful in practicing the invention. In determining the magnitudes of the circuit parameters for such design, preliminary considerations of adequate band width and gain for the amplifiers were resolved by selecting appropriate values for the resistors 79 and 73 to ensure such gain and band width. There follows a tabulation of such design information:

| | | |
|---|---|---|
| Tubes **63** and **65** | | Type 12AV7 |
| Tube **71** | | ½ Type 12AV7 |
| Resistor **72** | ohms | 424 |
| Resistors **73** and **79** | do | 6,800 |
| Resistor **74** | do | 1,000 |
| Resistor **75** | do | 167 |
| Resistor **76** | do | 3,330 |
| Resistor **78** | do | [1] 12,000 |
| Potential +B | volts | 310 |

[1] Upper portion, 3,500 ohms; lower portion 8,500 ohms.

Figure 4:
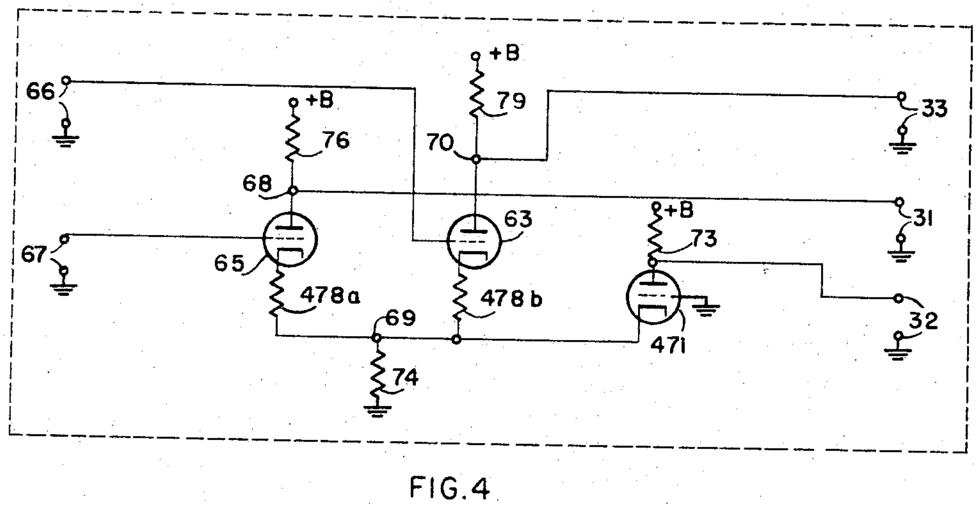
FIG. 4 is a circuit diagram of a modified form of a portion of the matrixing apparatus of FIG. 3.

*Description of embodiment of FIG. 4*

FIG. 4 is a circuit diagram of a modified form of a portion of the matrixing apparatus of FIG. 3, specifically, that portion of the matrixing apparatus comprising substantially only the impedance network. In view of the relationship of the circuits of FIG. 3 and FIG. 4, similar elements in these circuits are identified by the same reference numerals while analogous circuit elements are represented in the circuit of FIG. 4 by a reference numeral similar to that of the analogous element in FIG. 3 but with 400 added thereto.

The impedance network of FIG. 4 is essentially the same as the corresponding network of FIG. 3, differing principally in having a pair of cathode resistors **478*a* and 478*b* instead of the resistors 75 and 78 in the circuit of FIG. 3. Because of this change, there are also some minor changes in the circuit connections to the triode 471 in the embodiment of FIG. 4. As in the corresponding portion of FIG. 3 the triodes 63 and 65 have output terminals 68, 69 and 70, 69, respectively. The anode load resistors 76 and 79 comprise two of the three load circuits in the impedance network. The third load circuit is the resistor 74 coupled to the cathodes of the tubes 65 and 63 through the cathode load resistors 478*a* and 478*b*, respectively. The terminal 69 and, therefore, the load resistor 74 are directly connected to the cathode of the amplifier tube 471, the control electrode of which is connected to chassis-ground for other than unidirectional potentials. It should be understood that the admittance looking into the tube 471 is so large with respect to the magnitude of the resistor 74 that the circuit including the tube 471 is a major factor in determining the potential developed across the resistor 74. The anode circuit of the tube 471 includes the anode load resistor 73 and is connected to the pair of output terminals 32, 32**.

*Operation of embodiment of FIG. 4*

In general, the network of FIG. 4 operates in the same manner as the corresponding network of FIG. 3. A positive signal Q is applied through the terminals 67, 67 to the control electrode of the tube 65 and develops a negative Q signal in the anode circuit thereof and a positive Q signal in the cathode circuit thereof. Similarly, a negative signal I is applied through the terminals 66, 66 to the control electrode of the triode 63 to develop a positive I signal in the anode thereof and a negative I signal in the cathode thereof. As explained with reference to the corresponding circuit of FIG. 3, the negative Q signal in the anode circuit of the tube 65 combines with the proper amount of a negative I signal developed across the cathode load resistor 74 and, therefore, developed in the anode circuit of the tube 65 to develop a $G-Y$ signal across the load resistor 76 for application through the terminals 31, 31 to one of the control electrodes in an image-reproducing device. Similiarly, proper magnitudes and polarities of I and Q signals are developed across the anode load resistor 79 of the tube 63 to develop an $R-Y$ signal for application through the terminals 33, 33 to another control electrode of an image-reproducing device. The cathode load resistors **478*a* and 478*b* act in a manner similar to that of the resistor 78 of FIG. 3 to combine proper portions of —I and +Q signals to develop a positive $B-Y$ signal at the terminal 69 and across the resistor 74. This positive $B-Y$ signal is applied to the cathode of the amplifier 471 wherein it is amplified by an appropriate amount to develop a $B-Y$ signal across the anode load resistor 73 for application through the terminals 32, 32** to the third control electrode of the image-reproducing device.

The circuit analysis of the impedance network of FIG. 4 can be made in a manner similar to that described with reference to the corresponding networks of FIGS. 3 and 1.

Figure 5:
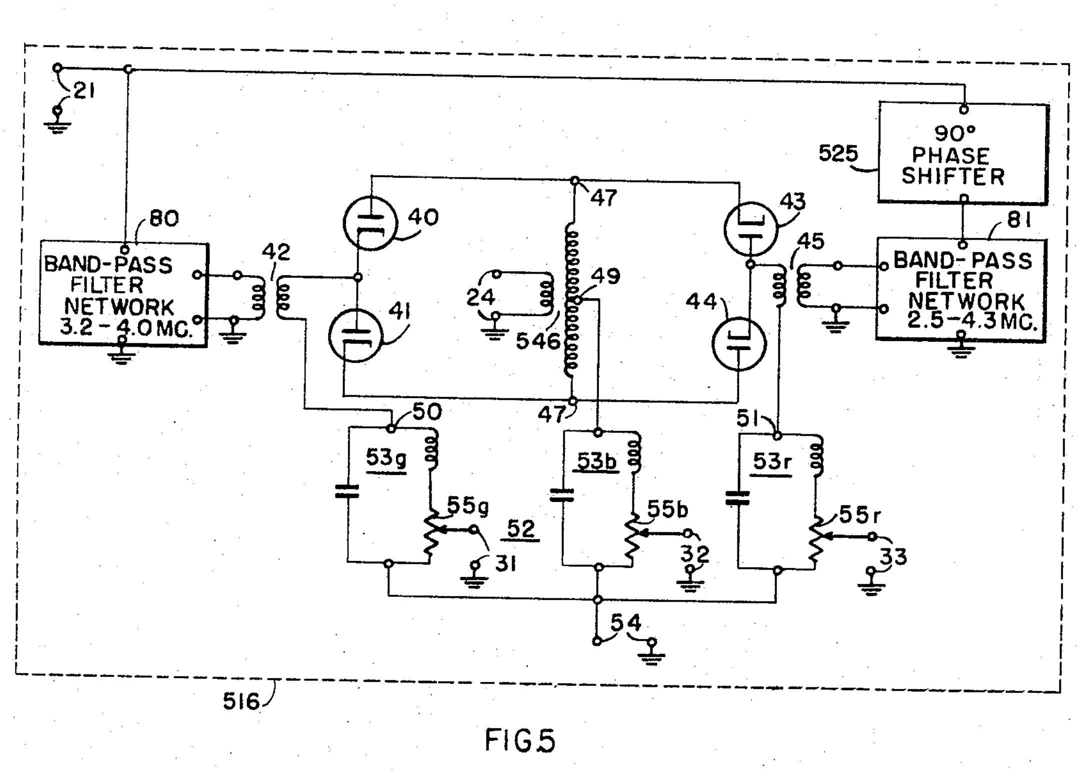
FIG. 5 is a schematic diagram of a modified form of the matrixing apparatus of FIG. 1.

*Description of embodiment of FIG. 5*

The matrixing apparatus of FIG. 5 closely corresponds to the matrixing apparatus 16 of FIG. 1 and, therefore, similar elements in these embodiments are identified by the same reference numerals while analogous circuit elements are represented in the embodiment of FIG. 5 by a reference numeral similar to that of the analogous element in FIG. 1 but with 500 added thereto.

The matrixing apparatus 16 of FIG. 1, as has previously been stated herein, is a simple apparatus for developing the desired color-difference signals. However, to make the most efficient utilization of the information on a subcarrier wave signal having as modulation components a wide band I and a narrow band Q signal, it is desirable to have channels through which the I and Q signals are translated which have pass bands which correspond to the band widths of the transmitted I and Q signals. The matrixing apparatus of FIG. 5 includes such channels essentially by rearranging the input circuits to the matrixing apparatus so that the I and Q signals are applied through the transformers 45 and 42, respectively, while the locally generated signal is applied through the transformer 546. The supply circuit includes a band-pass filter network 80 preferably having a pass band of 3.2–4.0 megacycles coupled between a pair of input terminals 21, 21 and the primary winding of the transformer 42 and a 90° phase shifter 525 and a bandpass filter network 81 preferably having a pass band of 2.5–4.3 megacycles coupled in cascade between the input terminals 21, 21 and the primary winding of the transformer 45. The transformers 42 and 45 have different primary-to-secondary turns ratios in the ratio of 4.35:3.73, respectively, for the purpose of applying Q and I signals with magnitudes in this ratio to the balanced detectors. The primary winding of the transformer 546 is connected to the pair of terminals 24, 24. The balanced detectors including the diodes 40, 41 and 43, 44 as well as the load circuits 53*g*, 53*b*, and 53*r* are the same as the corresponding detectors and load circuits in the apparatus 16 of FIG. 1. A direct-current restorer circuit such as the unit 56 of FIG. 1 may be coupled through the terminals 54, 54 to the load circuits 53*g*, 53*b*, and 53*r*.

*Operation of embodiment of FIG. 5*

Though the input circuits to the apparatus of FIG. 5 are different from the corresponding input circuits of the apparatus 16 of FIG. 1, the balanced detectors for deriving the modulation components +I and —Q and the load circuits for developing the color-difference signals $G-Y$, $R-Y$, and $B-Y$ operate in a manner similar to the corresponding units of FIG. 1. In the apparatus of FIG. 5, a composite video-frequency signal such as amplified in a unit such as the unit 13 of FIG. 1 is applied through the terminals 21, 21 to input circuits of the units 80 and 525 in the apparatus of FIG. 5. That portion of the signal applied to the filter network 80 having frequencies between 3.2 and 4 megacycles is translated through the unit 80 and coupled by means of the transformer 42 to the balanced detector including the diodes 40 and 41 with one magnitude. At least the upper frequencies of the signal applied to the unit 525 are shifted in phase by 90° and those frequencies between 2.5 and 4.3 megacycles are translated through the network 81 and coupled through the transformer 45 to that balanced detector including the diodes 43 and 44 with another magnitude, these magnitudes being in the ratio of 4.35:3.73 for the Q and I signals, respectively. A locally generated signal in proper phase and frequency with respect to the signals applied through the transformers 42 and 45, more specifically, a signal such as developed in a generator such as the unit 23 of FIG. 1, is applied through the terminals 24, 24 and the transformer 546 to both of the previously mentioned balanced detectors. In a manner similar to that described with reference to the apparatus 16 of FIG. 1, the +I and —Q modulation components are derived from the modulated subcarrier wave signal and developed, respectively, across the terminals 49, 51 and 49, 50. These I and Q signals differ from the corresponding signals in FIG. 1 in that the Q signal has a band width of approximately 500 kilocycles and the I signal has a band width of approximately 1.5 megacycles. The load circuits 53*g*, 53*b*, and 53*r* utilize such I and Q signals in the manner described with reference to the apparatus 16 of FIG. 1 to develop $G-Y$, $B-Y$, and $R-Y$ color-difference signals across the pairs of terminals 31, 31, 32, 32, and 33, 33, respectively, for application to control electrodes of an image-reproducing device such as the unit 14 of FIG. 1.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Matrixing apparatus for a color-television system for developing from a pair of signals individually representative of different components of the color of a televised image signals representative of other different components of said color of said image comprising: a pair of signal sources for individually supplying different ones of said pair of signals, said sources having a common output terminal and two other output terminals; and an impedance network coupled to said sources and including three load circuits each having two terminals one of which is common to said three load circuits with the other terminal of one thereof coupled to said common output terminal of said sources and with the other terminals of the others of said load circuits individually coupled to different ones of said other output terminals of said sources for causing currents representative of both of said supplied signals to flow through each of said load circuits, the impedances of said load circuits being so proportioned relative to each other that the currents flowing through different ones thereof individually represent said other different components of said color.

2. In a color-television receiver, matrixing apparatus for developing three color-representative signals from two modulation components at two different phase angles of a received color subcarrier signal comprising: two sources each for supplying one of said two modulation components; three load circuits; and means for connecting the sources and three load circuits in a network of three parallel branches comprising one load circuit in parallel with another load circuit and one source in series, and in parallel with the remaining load circuit and source in series, said sources and load circuits being so proportioned that the two modulation components mix in each of the load circuits in proportions and senses to develop one of three color-representative signals in each of the load circuits.

3. In a color-television receiver, matrixing apparatus for developing red, green, and blue color-difference signals from two modulation components at two different phase angles of a received color subcarrier signal comprising: two sources each for supplying one of said two modulation components; three load circuits; and means for connecting the sources and three load circuits in a network of three parallel branches comprising one load circuit in parallel with another load circuit and one source in series, and in parallel with the remaining load circuit and source in series, said sources and load circuits being so proportioned that the two modulation components mix in each of the load circuits in proportions and senses to develop one of the red, green, and blue color-difference signals in each of the load circuits.

4. In a color-television receiver, matrixing apparatus for developing three color-representative signals from two modulation components at two different phase angles of a received color subcarrier signal comprising: two sources each for supplying one of said two modulation components; three load circuits; means for connecting the sources and three load circuits in a network of three parallel branches comprising one load circuit in parallel with another load circuit and one source in series, and in parallel with the remaining load circuit and source in series, said sources and load circuits being so proportioned that the two modulation components mix in each of the load circuits in proportions and senses to develop one of the three color-representative signals in each of the load circuits; and means for deriving one of said three color-representative signals from each of the load circuits.

5. In a color-television receiver, matrixing apparatus for developing red, green, and blue color-difference signals from two modulation components at two different phase angles of a received color subcarrier signal comprising: two sources each for supplying one of said two modulation components; three load circuits; means for connecting the sources and three load circuits in a network of three parallel branches comprising one load circuit in parallel with another load circuit and one source in series, and in parallel with the remaining load circuit and source in series, said sources and load circuits being so proportioned that the two modulation components mix in each of the load circuits in proportions and senses to develop one of the red, green, and blue color-difference signals in each of the load circuits; and means for deriving one of said three color-difference signals from each of the load circuits.

6. In a color-television receiver, said color-television receiver adapted to receive a color-television signal, said color-television signal including a color subcarrier containing a plurality of color signals, each of said color signals corresponding to a predetermined signal phase, matrix means adapted to accept a first plurality of signals corresponding to a first group of predetermined signal phases in said color subcarrier to yield a second plurality of signals corresponding to a second group of predetermined signal phases, said matrix means comprising in combination, a plurality of transmission networks, each of said transmission networks having a first control electrode, a second control electrode, and an output electrode, a mutual impedance coupled to the first control electrode of each of said transmission networks to cause any signal developed in one transmission network to drive each of the other transmission networks, means for coupling each of said plurality of signals to the second control electrode of a prescribed group of said transmission networks corresponding in number to said first plurality of signals, means for utilizing said mutual impedance to produce signal addition of determinable amplitudes and polarities of said first plurality of signals at the output terminals of each of said transmission networks to cause each signal of said second plurality of signals to appear at the output terminal of one of said plurality of transmission networks.

7. In a color-television receiver adapted to receive at least a chrominance signal, the combination of means to demodulate a first and second color-difference signal from said chrominance signal corresponding to prescribed angles of said chrominance signal, a plurality of amplifiers having a mutual cathode resistor, means for applying said first and second color-difference signals to selected amplifiers of said plurality, means for adding selected amplitudes and polarities of said first and second color-difference signals in said plurality of amplifiers to develop at least a trio of color-difference signals corresponding to angles of said chrominance signal other than said prescribed angles.

8. In a color-television receiver adapted to receive at least a chrominance signal, the combination of demodulator means to demodulate a first and second color-difference signal from said chrominance signal corresponding to information at determinable angles of said chrominance signal, a trio of electron steam devices each having output circuits and coupled to cause modulation introduced in one electron stream to provide corresponding modulations in the other electron stream devices, means for modulating the electron streams of a pair of said trio with said first and second color-difference signals respectively, means for causing signal addition in each of said trio due to said coupling to develop each of a trio of color-difference signals corresponding to angles of said chrominance signal other than the angles corresponding to said first and second color-difference signals in each output circuit.

9. In a color-television receiver adapted to receive a color-television signal including a chrominance signal wherein different color-difference signals occur at different phases; the combination of: a first demodulator means to demodulate a first color-difference signal from a first phase of said chrominance signal, a second demodulator means to demodulate a second color-difference signal from a second phase of said chrominance signal, a first and second electron tube each having a cathode and an anode and a control electrode, a fixed potential point, a cathode resistor coupled from the cathodes of said first and second electron tubes to said fixed potential means, circuit means coupled between the anodes of said first and second electron tubes and said fixed potential point to render said first and second electron tubes operative whereby signals applied to the control electrodes of said first and second electron tubes will be combined across said cathode resistor, means coupling said first and second demodulator means to the control electrodes of said first and second electron tubes respectively to apply said first and second color-difference signals to the control electrodes of said first and second electron tubes respectively whereby a third color-difference signal representing signal combinations of prescribed polarities of said first and second color-difference signals is developed across said cathode resistor.

10. In a color-television receiver adapted to receive a color-television signal including a chrominance signal wherein different color-difference signals occur at different phases, the combinaton of: a first demodulator means to demodulate a first color-difference signal from a first phase of said chrominance singal, a second demodulator means to demodulate a second color-difference signal from a second phase of said chrominance signal, a first and second amplifier each having an input terminal and cathode and both having a common output load operatively connected therewith to each cathode to produce a signal combination of signals applied to the input terminals of said first and second amplifiers, and means coupling said first and second demodulator means to the input terminals of said first and second amplifiers respectively to develop a color-difference signal representing a signal combination of said first and second color-difference signals across said common output load.

11. In a color-television receiver adapted to receive a color-television signal including a chrominance signal wherein different color-difference signals occur at different phases, the combination of: first demodulator means to demodulate a first color-difference signal from a first phase of said chrominance signal, second demodulator means to demodulate a second color-difference signal from a second and different phase of said chrominance signal, an amplifier having an input circuit and a first and second output load and operatively connected to develop different polarities of a signal across said first and second output loads in response to that signal applied to said input circuit, means coupling said first demodulator means to said input circuit to apply said first color-difference signal to said input circuit to develop different polarities of said first color-difference signal across said first and second output loads, and means coupling said second demodulator means to one of said first and second output loads to produce a signal combination of said first and second color-difference signals across at least one of said first and second output loads.

12. In a color-television receiver, matrixing apparatus for developing from two modulation components, occurring at two prescribed angles of a received color subcarrier signal, at least two color-representative signals at angles other than said prescribed phase angles, comprising: two source means, each for supplying one of said two modulation components; and load circuit means coupled to the sources for matrixing the two modulation components in three portions of the load circuit, one portion of which is coupled in common to the other two, in proportions and senses to develop said color-representative signals at said other phase angles in the load circuit.

13. In a color-television receiver adapted to receive at least a chrominance signal, matrixing apparatus comprising: means for providing first and second color-representative signals from said chrominance signal at prescribed phase angles thereof; a pair of circuit loops; means for applying said first and second color-representative signals individually to corresponding ones of said circuit loops; and means including an impedance circuit coupled in common to said pair of circuit loops for cross-coupling selected amplitudes and polarities of said first and second color-representative signals between said pair of circuit loops to develop at least two new color-representative signals at angles of said chrominance signal other than said prescribed angles.

14. Matrixing apparatus for a color-television system for developing from a pair of signals individually representative of different components of the color of a televised image, signals representative of other different components of said color of said image comprising: a pair of signal sources for individually supplying different ones of said pair of signals; and an impedance network having two circuit loops individually coupled to said sources and including three impedance elements, one of which is common to said two circuit loops, for causing currents representative of both of said supplied signals to flow through each of said impedance elements, the impedances of said elements being so proportioned relative to each other that the currents flowing through different ones thereof individually represent said other different components of said color.

15. In a color television receiver including a source of a chrominance signal comprising phase and amplitude modulated color subcarrier waves, the modulation of said color subcarrier waves being such that demodulation of said waves at a first predetermined phase will produce a $R-Y$ signal, demodulation of said waves at a second predetermined phase will produce a $B-Y$ signal, and demodulation of said waves at a third predetermined phase will produce a $G-Y$ signal, said receiver also including a source of reference oscillations of color subcarrier frequency, and color image reproducing apparatus adapted to reproduce color images in response to the delivery of $R-Y$, $B-Y$, and $G-Y$ signals, respectively, to respective first, second and third input terminals thereof, a color demodulator system comprising in combination: first and second demodulating means each having separate output circuit means for developing respectively different first and second color signal outputs, means for applying reference oscillations from said source to said first demodulating means in a fourth predetermined phase different from any of said first, second and third predetermined phases, means for applying reference oscillations from said source to said second demodulating means in a fifth predetermined phase different from any of said first, second, third and fourth predetermined phases, means for applying modulated, color subcarrier waves from said chrominance signal source to each of said first and second demodulating means, and common output circuit means coupled to both of said first and second demodulating means for providing a third color signal output and for causing interaction between said first and second demodulating means such that the first color signal output produced in the separate output circuit means of said first demodulating means corresponds to one of said $R-Y$, $G-Y$ and $B-Y$ signals, the second color signal output produced in the separate output circuit means of said second color demodulator means corresponds to a second one of said $R-Y$, $G-Y$ and $B-Y$ signals, and the third color signal output produced in the common output circuit means of both of said first and second demodulating means corresponds to the remaining one of $R-Y$, $G-Y$ and $B-Y$ signals, and means for coupling said first, second and third input terminals to the respectively appropriate output circuit means.

16. In a color television receiver including a source of a chrominance signal comprising phase and amplitude modulated color subcarrier waves representative of $R-Y$ signal information at a first predetermined phase, representative of $B-Y$ signal information at a second predetermined phase, and representative of $G-Y$ signal information at a third predetermined phase, said receiver also including a source of reference oscillations of said color subcarrier frequency, and color signal utilization means requiring the delivery of $R-Y$, $B-Y$ and $G-Y$ signals, respectively, to the respective first, second and third input terminals thereof, the combination comprising: first and second demodulating means for heterodyning said modulated subcarrier wave with reference oscillations to produce respectively different color difference signal outputs in respectively separate output circuit means, means for applying modulated color subcarrier waves from said chrominance signal source to each of said first and second demodulating means, means for separately applying to each of said first and second demodulating means reference oscillations of respectively different selected phases different from any of said first, second and third predetermined phases, whereby the heterodyning action in each of said demodulating means is such as to produce respective color signal outputs in the respective separate output circuit means which are representative of signal information other than said $R-Y$, $B-Y$ and $G-Y$ signals in the absence of interaction between said first and second demodulating means, and means for causing interaction between said first and second demodulating means such that the color signal outputs produced in the respectively separate output circuit means of said first and second demodulating means are representative of different ones of said $R-Y$, $B-Y$ and $G-Y$ signals, said interaction causing means comprising impedance means common to both of said first and second demodulating means for combining signals from both said first and second demodulating means and for influencing said signal production in both of said respectively separate output circuits, means for deriving the remaining one of said $R-Y$, $B-Y$ and $G-Y$ signals from said common impedance means, and means for supplying the required signal information to each of said first, second and third input terminals from the respectively appropriate one of said separate output circuit means and output signal deriving means.

(References on following page)

References Cited

UNITED STATES PATENTS

| | | | |
|---|---|---|---|
| 2,020,409 | 11/1935 | Green | 333—70 |
| 2,243,140 | 5/1941 | Weagant | 250—27.1–6 |
| 2,270,697 | 1/1942 | Clark | 250—27.1–6 |
| 2,600,405 | 6/1952 | Hoeppner | 333—70 |
| 2,633,529 | 3/1953 | Eltgroth | 333—70 |
| 2,641,695 | 6/1953 | Lovell | 250—27.1–6 |
| 2,718,546 | 9/1955 | Schlesinger | 178—5.4 |
| 2,766,321 | 10/1956 | Parker | 178—5.4 |

OTHER REFERENCES

Principles of NTSC Compatible Color Television, Electronics, February 1952, pp. 88–95.

RCA Review, June 1953, pp. 205–226.

JOHN W. CALDWELL, *Acting Primary Examiner.*

DAVID REDINBAUGH, ROBERT H. ROSE, STEPHEN W. CAPELLI, *Examiners.*

NEWTON N. LOVEWELL, J. A. O'BRIEN, L. P. SPECK, R. SEGAL, R. MURRAY, *Assistant Examiners.*